United States Patent [19]
Woltz et al.

[11] Patent Number: 5,307,837
[45] Date of Patent: May 3, 1994

[54] WATER VALVE APPARATUS

[76] Inventors: Robert L. Woltz, 625 High Dr., Laguna Beach, Calif. 92651; Christopher K. Wynkoop, 601 Rockford Rd., Corona del Mar, Calif. 92625

[21] Appl. No.: 96,767

[22] Filed: Jul. 23, 1993

Related U.S. Application Data

[63] Continuation-in-part of Ser. No. 969,715, Oct. 27, 1992, Pat. No. 5,230,365.

[51] Int. Cl.⁵ .................... F16K 11/10; F16K 31/08; F16K 31/62
[52] U.S. Cl. ...................... 137/607; 251/65; 251/294; 251/295
[58] Field of Search ............... 137/607; 251/294, 295, 251/65

[56] References Cited

U.S. PATENT DOCUMENTS 3,594,828 7/1971 Seek .................................. 251/295 X
3,818,928 6/1974 Carsten ............................. 251/65 X
5,107,894 4/1992 Hochstrasser ....................... 137/607

Primary Examiner—Arnold Rosenthal
Attorney, Agent, or Firm—Walter A. Hackler

[57] ABSTRACT

Water valve apparatus with distal control includes at least one valve for controlling flow of water therethrough and having a movable actuator for starting and stopping the flow of water. A permanent magnet, disposed proximate said actuator for magnetic engagement therewith, is provided for moving the actuator between a first position stopping water flow through the valve and a second position allowing water flow through the valve. A movable member is provided to alter the magnetic engagement between the permanent magnet and the actuator in order to move the actuator. A cable, having a slidable center wire attached to the movable member and a sheath attached to the valve is connected to a manually operable lever, for operating said cable in a manner causing movement of the movable member and concomitant movement of the actuator, as a result of magnetic engagement alteration, in order to start and stop water flow through the valve.

18 Claims, 3 Drawing Sheets

WATER VALVE APPARATUS

This application is a continuation-in-part of U.S. Ser. No. 07/969,715 filed Oct. 27, 1992, now U.S. Pat. No. 5,230,365 issued Jul. 27, 1993.

The present invention generally relates to water valve apparatus and is more particularly directed to water valve apparatus with distal control.

Remote control water valves have heretofore found use in many medical and industrial applications in which the volume of water flow must be controlled independently from the user's hands.

Remotely operated water valves, controlled by, for example, knee motion or foot motion, are also particularly advantageous for many handicapped persons. Unfortunately, the installation of such remotely controlled valves has heretofore been expensive and complicated due to the necessity of special plumbing lines to and from remote disposed valves and the like.

Existing complicated and expensive plumbing configurations and the complex nature of heretofore proposed remote valve devices have inhibited the retrofitting of millions of existing wash basins and the like, which would be advantageous for both convenience and necessity to many handicapped individuals.

An additional deterrent to retrofit or after market devices for converting an existing faucet system into a remote control system is the typical lack of space in conventional cabinets housing the residential sink or basin.

Safety requirements are also a consideration, particularly if the adaptation of a conventional faucet system requires electrical connection for operation. Electrical requirements can add significant cost to such installations due to the necessary additional circuit outlets which should be of the ground fault type.

Hence, there is a need for a water valve apparatus with remote control which may be retrofitted to existing faucets in a safe, economical manner, without the additional complex running of plumbing lines to and from a remote switch and a requirement for electrical power.

The present invention satisfies that need in providing a water valve system which may be easily installed beneath an existing water basis or within a kitchen cabinet with only the use of short plumbing flex lines.

SUMMARY OF THE INVENTION

Water valve apparatus with distal control in accordance with the present invention generally includes valve means for controlling flow of water therethrough with the valve means including a movable actuator for starting and stopping the flow of water. A permanent magnet is provided and disposed proximate to the actuator for magnetic engagement therewith, which provides means for moving the actuator between a first position, stopping water flow through the valve, and a second position, allowing water flow through the valve.

In addition, a movable member is provided in order to alter the magnetic engagement between the permanent magnet and the actuator in order to move the actuator.

A cable having a distal and a proximal end is provided for moving the movable member with the cable proximal end being connected with the movable member and a manually operated lever connected to the cable means distal end provides a means for operating the cable in a manner causing movement of the permanent magnet and concomitant movement of the actuator as a result of magnet engagement alteration, in order to start and stop water flow through the valve.

Because there is only a mechanical link by way of the cable between the lever and the movable member, no electrical components are necessitated by the installation of the apparatus in accordance with the present invention.

A valve housing may be provided, which includes both hot and cold water inlets and outlets for cold water valve means for controlling the flow of cold water and hot water valve means for controlling the flow of hot water.

Flexible water lines provide a means for interconnecting the valve housing hot and cold water inlets and outlets to hot and cold water sources and to hot and cold water inlets of existing water faucets, without fixing the valve housing to any permanent structure.

In conjunction therewith, the cable may comprise a slidable center wire attached to the movable member and a sheath, surrounding this center wire and affixed to the valve housing, provides means for enabling the operation of the valve means through the cable means without stabilizing the valve housing.

This is important in that the valve housing need not be rigidly mounted to a structure beneath the basin, such as a wall or other rigid plumbing pipes or valves. Therefore, the housing in accordance with the present invention may be loosely arranged within a base and cabinet, around, under, or suspended through existing pipes and valves which greatly facilitates the installation thereof.

More particularly, the water valve apparatus in accordance with the present invention may include two hereinabove referenced valve means, one for hot and one for cold water, each including an actuator, coupled by a separate permanent magnet. In this instance, two movable members may be provided, each one associated with an actuator/permanent magnet arrangement.

Means may be provided for enabling simultaneously the two separate movable members by the cable means.

To ensure coupling of the permanent magnets with the actuators, the permanent magnets may have the shape of a doughnut and arranged so that the actuators are disposed for movement within a center hole of each of the doughnut-shaped magnets. Alteration of the magnetic engagement is effected by mounting the movable members for movement between an actuator and respective permanent magnets.

In order to facilitate use of the valve apparatus, the manually operated lever may include a releasable lock means for holding the movable members in a position maintaining the actuators in a position allowing continued water flow through the valves. In one embodiment of the present invention, manually operated lever means may comprise a foot pedal and, in another embodiment of the present invention, manually operated lever means may comprise a knee pedal.

BRIEF DESCRIPTION OF THE DRAWINGS

The advantages and features of the present invention will be better understood by the following description when considered in conjunction with the accompanying drawings in which.

DETAILED DESCRIPTION

Figure 1:
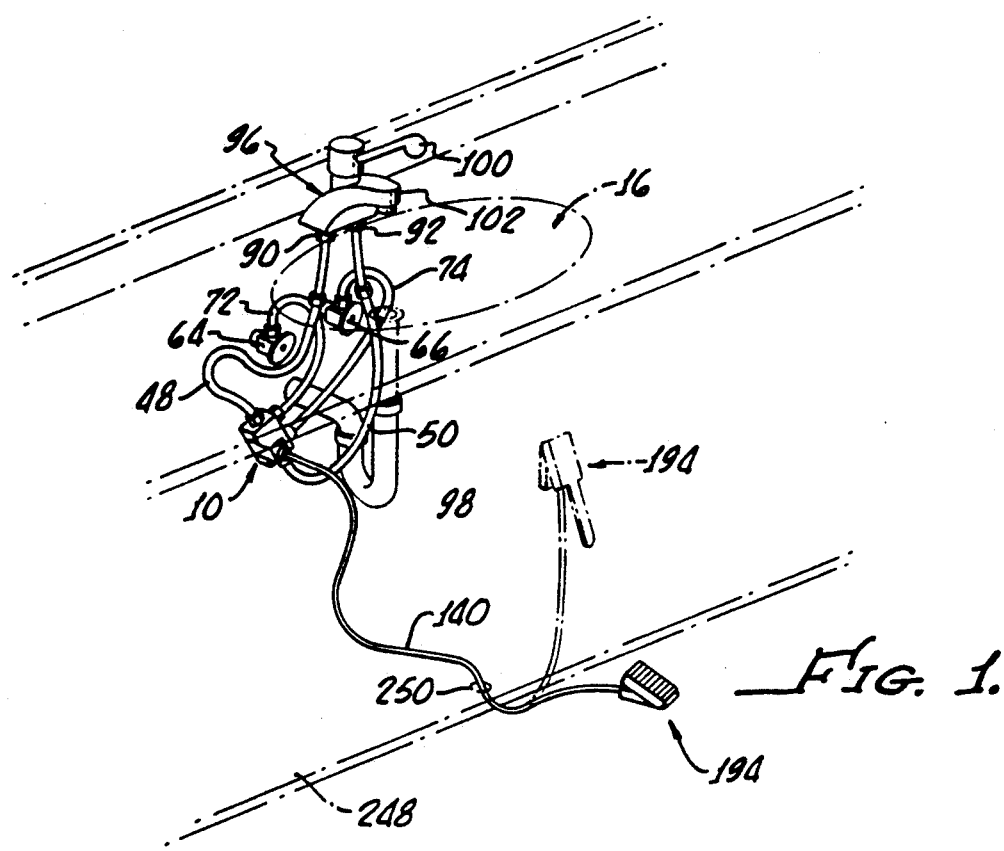
FIG. 1 is a perspective view of the present invention as installed in a typical lavatory sink.
Figure 2:
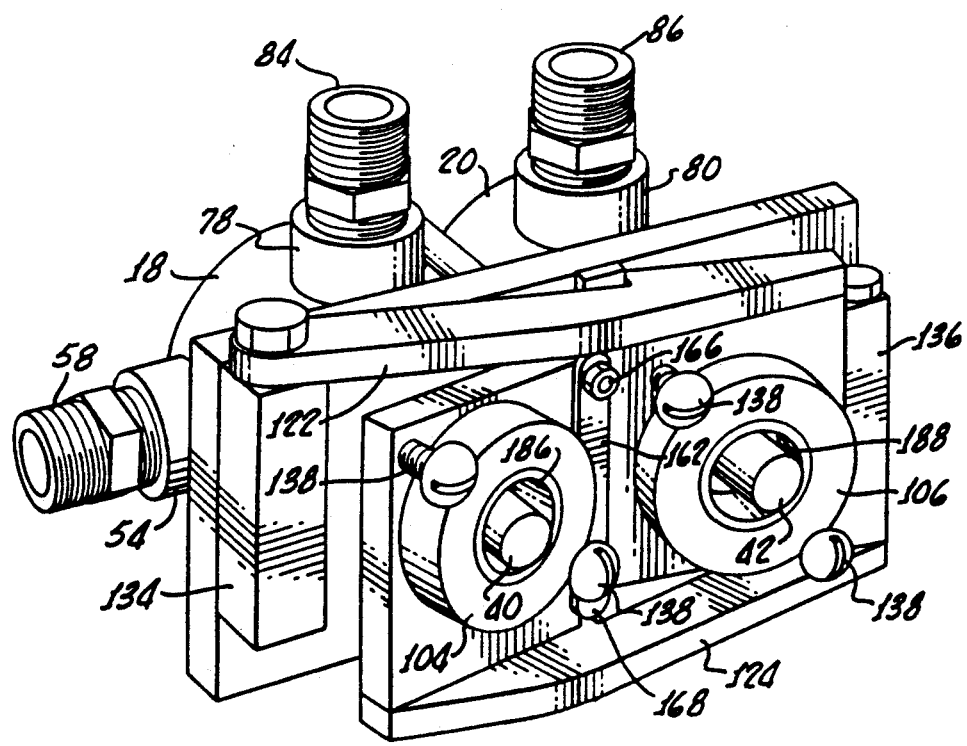
FIG. 2 is a perspective view of the present invention showing in particular doughnut-shaped magnets encircling valve actuators.
Figure 3:
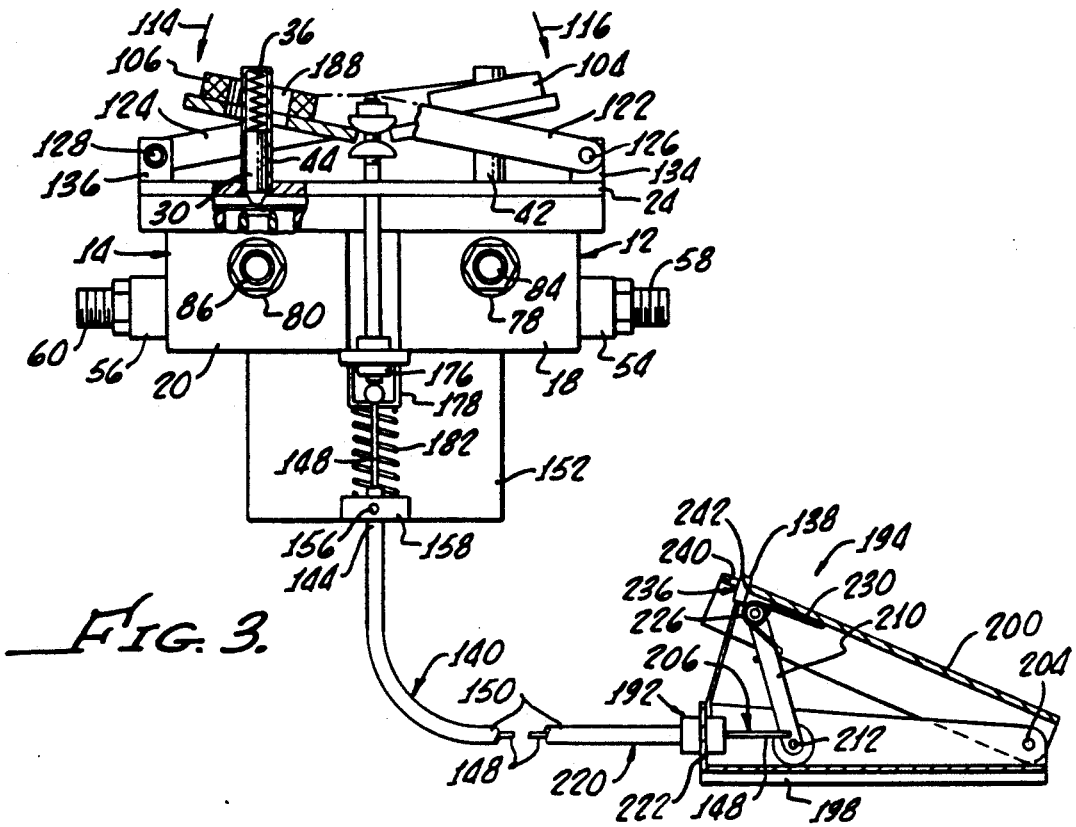
FIG. 3 is a cross-sectional view of the present invention showing a remote control and valves in a closed position.

Turning now to FIG. 1, there is shown water valve apparatus 10 in accordance with the present invention as it may be installed beneath a conventional sink 16 or the like. FIG. 2 and FIG. 3 more particularly show the apparatus as generally including diaphragm type valves 12, 14, which provide a means for controlling hot and cold water therethrough, respectively.

The valves may be enclosed by housings 18, 20 and held in an abutting adjacent relationship by a plate 24, conventionally screwed or riveted to the housings 18, 20. Alternatively the valves 12, 14 may be enclosed in a unitary housing.

Diaphragm valves 12, 14, suitable for use in the present invention, are commercially available from the Horton Company of Pittsburgh, Pennsylvania, with specific utility of Model No. 525, produced by the Horton Company. These types of valves are well-known and are controlled by actuators 30, which are spring 36 biased within tubes 42, 44, interconnected with the housings 18, 20 through the plate 24. Valves of this type are typically utilized in laundry and dishwashing appliances (not shown), in which the actuators 30 are coupled to solenoids (not shown) for movement of the actuators 30 within tubes 42, 44 in order to open and close the diaphragm (not shown) in each valve 12, 14, in a conventional manner.

Flex lines 48, 50, coupled respectively to hot water inlets 54, 56 by means of threads 58, 60, provide a means for coupling the valves 12, 14 to hot and cold water sources 64, 66, respectively.

Outlet flex lines 72, 74, similarly connected to hot and cold water outlets 78, 80 by means of threads 84, 86, provide a means for connecting the valves 12, 14 to the hot and cold water inlets 90, 92, respectively, of a conventional faucet 96.

It is important to appreciate that the flex lines 48, 50, 72, 74, which may be reinforced plastic, contribute significantly to the present invention. These flex lines enable the valves 12, 14 to be positioned beneath the sink 16 and the faucet 96 in and around plumbing which includes a sink trap 98, without requiring rigid mounting of the valves 12, 14. Thus, depending upon the length of the flex lines 48, 50, 72, 74, the valves 12, 14 may be placed in any convenient position beneath the faucet 96 and, as hereinafter described, no interference with the operation of the valves 12, 14 is caused by such a "floating" configuration. Naturally, this drastically simplifies the installation of the apparatus 10 so that such installation may be accomplished by a homeowner.

Simultaneous operation of the valves 12, 14, as hereinafter described, enable the faucet lever 100 to be adjusted to a preselected position to control a desired temperature of water exiting from the faucet spout 102. Naturally, faucets with dual controls (not shown) may similarly be preset for use with the apparatus 10 in accordance with the present invention.

The presetting of the faucet lever 100 enables operation of the apparatus 10 to turn water on through the faucet spout 102 at a preselected volume and temperature, thus facilitating the use of the faucet by a handicapped person, incapable of controlling the lever 100 or separate turnable controls (not shown).

As more clearly shown in FIG. 2, ring magnets 104, 106 are disposed proximate and surrounding the actuators 30, 32 within actuator tubes 42, 44, respectively for magnet engagement therewith and for moving the actuator tubes 42, 44 between a first position (shown in solid line) stopping water flow through the valves 12, 14 and a second position, shown in FIG. 3, allowing water to flow through the valves 12, 14. As shown in FIG. 3, the spring 36 maintains the actuator 30 in an "off" position when the ring magnet 106 is in the first position. Movement of the ring magnets 104, 106 in the direction of arrows 114, 116 causes sufficient coupling between the magnets 104, 106 and the actuators 30 to move the actuators 30 in the direction of the arrow 118 and against the action of spring 36 to open the respective valves 12, 14.

Each of the ring magnets 104, 106 is held in position by arms 122, 124, respectively, which are pivotally mounted to the plate 24 by means of pins 126, 128 through pivot mounts 134, 136, respectively. Screws 138 may be used to secure the magnets 104, 106 to the arms 122, 124. A Bodin or bicycle-type cable 140 includes a proximal end 144, including a slidable wire 148 and a sheath 150 fixed to a bracket 152 attached to the valve housings 18, 20 through the plate 24.

Because the sheath is fixed to the valve housing, the slidable wire 148 is movable with respect thereto, which enables the valve housing 18, 20 to "float" while being attached to the hot and cold water sources 64, 66 and hot and cold water inlets 90, 92 by means of the flex lines 48, 50, 72, 74. A set screw 156 in a mounting bushing 158, attached to the bracket 152, enables a length adjustment of the cable 140 as hereinafter described in greater detail.

The slidable wire 148 is attached to a bar 162 with the bar 162 being loosely attached to the arms 122, 124 by means of bushings 166, 168, in order to provide a means for simultaneous movement of the two separate permanent magnets 104, 106 by the cable 140.

The embodiment as shown in the drawings, the cable 140 with slidable wire 148 therein, operates to open the valves upon pulling of the sliding wire 148 into the sheath 150, as shown by the arrow 172. (See FIG. 4.) Alternatively, the cable 140 and valve 12, 14 arrangement may be provided so that pushing of the slidable wire 148 out of the sheath 150 enables opening the valves. The slidable wire 148 may be guided through the valve housings 18, 20 through a bushing arrangement 176, and a clamp 178 fixed to the slidable wire 148 enables a spring 182, disposed between the clamp 178 and the bushing 158, to return the slidable wire 148 and magnets 104, 106 to a position (see FIG. 3) closing the valves 12, 14 when force pulling the slidable wire 148 is released.

In operation, a center hole 186, 188 in each of the magnets 104, 106 is sized to enable movement of the magnets in the direction of the arrows 114, 116 without binding contact with the actuator tubes 42, 44. The magnets, of course, are sized in width and pre-magnetized to ensure sufficient coupling with the actuators 130, 132. While other shaped magnets may be used, it has been found that the ring magnet 104, 106 configuration provides uniform coupling with the actuators 30 without causing detrimental resistance between the actuators 30 and the actuator tubes 42, 44, due to magnetic coupling between the magnets 104, 106 and actuators 30.

Figure 4:
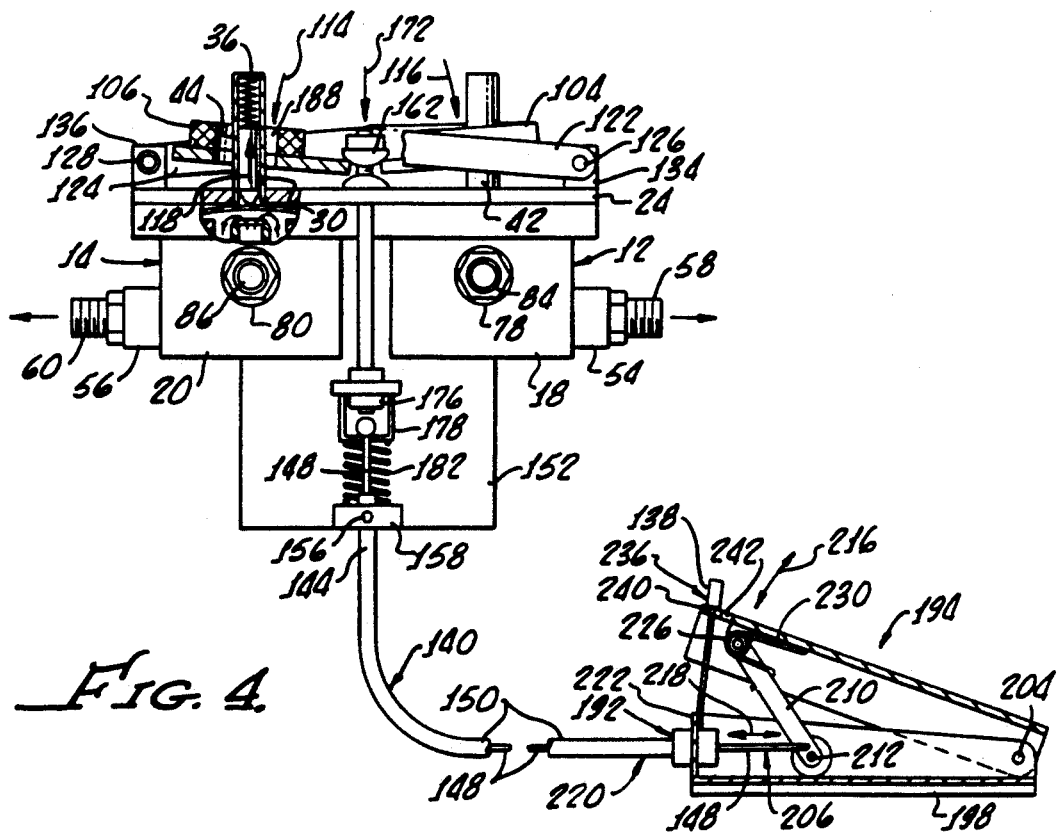
FIG. 4 is a cross-sectional view of the present invention showing the remote contacts depressed and the valves in an open position.

Turning now to FIGS. 3 and 4, in one embodiment of the present invention, the distal end 192 of the cable 140 is attached to a pedal 194 which includes a base 198 and a tread 200 pivotally attached to the base by a means of a pin 204. As shown in FIG. 1, dashed lines, the pedal may be mounted for operation by a knee (not shown). A distal end 206 of the slidable wire 148 is attached an arm 210 proximate a base pivot 212, so that movement of the tread 200 by a knee or foot (not shown) depressing and releasing the tread 200 in the directions indicated by the double-headed arrow 216 causes translational movement of the wire 148, as indicated by the arrow 218. With a distal end 220 of the sheath 150 attached to an end bracket 222 of the base, movement of the slidable wire 148 is not translated to the sheath 150 which is fixed to the brackets 152 and 222.

The arm 212 is pivotally mounted to the tread 200 by means of a pin 226, and a spring 230 causes the tread 200 to return to a spaced apart relationship with the base 198 after a depressing force applied thereto is released.

In order to lock the tread 200 in a depressed position, a wire 234 attached to the base 198 and extending through a hole 236 in the tread with a protruding head 138 is provided. The hole 236 having a keyhole shape enables the head 138 to fall into a slot portion 140 of the hole 236 to maintain the tread 200 in a depressed position. To release the tread 200, the head 138 is merely pushed into a circular portion 242 of the hole 236.

The pedal 194 may be installed at the base of a sink cabinet 248, shown in FIG. 1 (solid line), after interconnection of the flex lines 48, 50, 72, 74. During installation, the cable sheath 150 is released from the bushing 158 via the set screw 156 and the slidable wire 148 removed from the bar 162 for enabling installation of the cable 140 through the cabinet 248 without the necessity of cutting a large hole for the foot pedal 194. A small hole 250 drilled in the cabinet 248 enables passage of the cable which is thereafter interconnected with the valve housing 18, 20, as hereinabove described. After placement of the pedal, the set screw 156 allows a length adjustment of the sheath 150 to ensure that the pedal depression operates with the magnets 104, 106 through the arms 122, 124.

Figure 5:
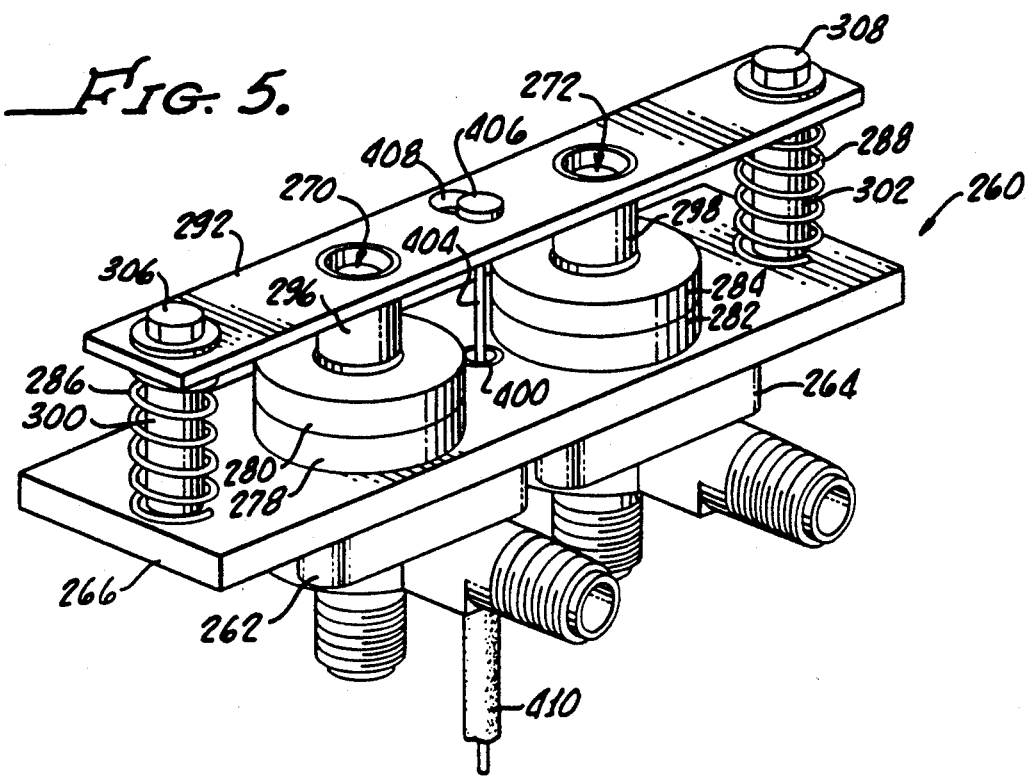
FIG. 5 is a perspective view of an alternative embodiment of the present invention.
Figure 6:
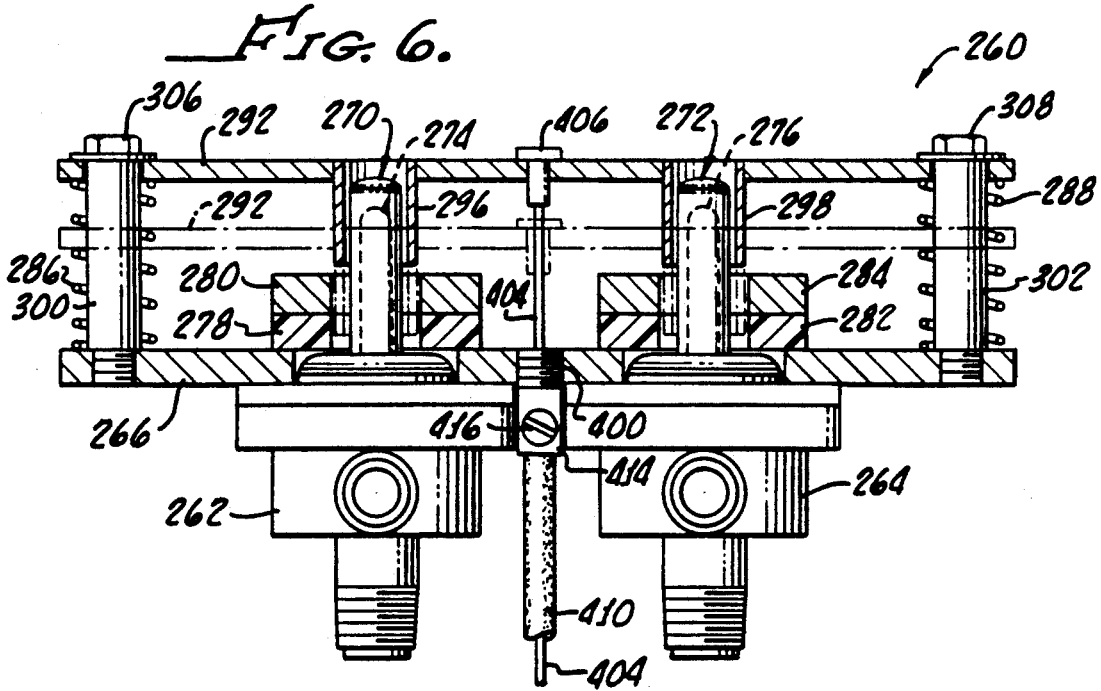
FIG. 6 is a cross-sectional view of the embodiment shown in FIG. 5.

Turning now to FIGS. 5 and 6, there is shown an alternative embodiment 260 of a water valve apparatus in accordance with the present invention, which generally includes diaphragm valves 262, 264 identical to or similar to valves 12, 14, with the valves 262, 264 held in a spaced apart relationship by a mounting plate 266. Operation and connection of the valves 264, 266 is the same as hereinbefore described in connection with embodiment 10 of the present invention. Valves 262, 264 with actuator tubes 270, 272 for supporting actuators 274, 276 operate in a manner identical to the actuators 30 and tubes 42, 44 hereinabove described.

One or more permanent magnets 278, 280, 282, 284 are fixed to the mounting plate 266 in a position surrounding the actuators 270, 272 respectively. This relationship provides for a magnetic engagement between the permanent magnets and the actuators similar to that hereinabove described in connection with embodiment 10 of the present invention. Spring 286, 288 mounted to the plate 266 bias a movable member 292 which provides a means for altering the magnetic engagement between the permanent magnets 278, 280, 282, 284 and the actuators 274, 276.

In that regard, depending cylinders 296, 298 are sized and configured for movement from an up position, shown in solid line in FIG. 6, to a down position, shown in phantom line in FIG. 6. When the depending cylinders 296, 298, as well as the member 292, are in the up position, full magnetic engagement is effected between the permanent magnets 278, 280, 282, 284 and the actuators 274, 276.

Preferably, the depending cylindrical members are formed of a ferromagnetic material and therefore the positioning between the permanent magnets 278, 280, 282, 284 and the actuators 274, 276 alters the magnetic engagement. The permanent magnets are sized and of proper strength such that when the depending cylindrical members are disposed between the permanent magnets and the actuators, the field is altered, or interrupted, sufficiently to enable the actuators to move in position, thus controlling flow of water through the valves 262, 264 as hereinbefore discussed.

The member 292 is stabilized by support rods 300, 302 and secured through the use of nuts 306, 308. Passing through an opening 400 in the plate 266 is a slidable wire 404 having a head 406 sized to pass through an opening 408 in the member 292 and engage the member 292 as shown by translational movement to a portion of the hole 408 smaller than the head 406. A cable 410 having a slidable wire 404 therein is interconnected to the foot pedal 194, as shown in FIG. 3 and hereinabove discussed. As also hereinabove described, the slidable wire 404 may be guided through the plate 266 by means of a bushing arrangement 414 with a set screw 416 for enabling a length adjustment of the cable 410 as hereinabove described and shown in FIG. 3.

Although there has been hereinabove described a specific water valve apparatus in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. Water valve apparatus with distal control comprising:

valve means for controlling flow of water therethrough, said valve means including a movable actuator for starting and stopping the flow of water;

permanent magnet means, disposed proximate said actuator for magnetic engagement therewith, for moving the actuator between a first position stopping water flow through the valve means and a second position allowing water flow through the valve means;

movable means for altering the magnetic engagement between the permanent magnet means and said actuator;

cable means, having a distal end and a proximal end, for moving said movable means; said cable means proximal end being connected with said movable means; and manually operable lever means, connected to the cable means distal end, for operating said cable means in a manner causing movement of the movable means and concomitant movement of the actuator means, as a result of magnetic engagement alteration, in order to start and stop water flow through the valve means.

2. Water valve apparatus with distal control comprising:

two valve means for separately controlling two flows of water, each said valve means including a movable actuator for starting and stopping the flow of water;

permanent magnet means, disposed proximate each of said actuators for magnetic engagement therewith, for moving the actuators between a first position stopping water flow and a second position allowing water flow through each valve means;

movable means for altering the magnetic engagement between the permanent magnet means and said actuators;

cable means, having a distal end and a proximal end, for moving said movable means; said cable means proximal end being connected with said movable means; and manually operable lever means, connected to the cable means distal end, for operating said cable means in a manner causing movement of the movable means and concomitant movement of the actuator means, as a result of magnetic engagement alteration, in order to start and stop water flow through the valve means.

3. The apparatus according to claim 2 wherein the movable permanent magnet means comprises two separate permanent magnets and two movable means.

4. The apparatus according to claim 3 further comprising means for enabling simultaneous movement of the two separate movable means by the cable means.

5. The apparatus according to claim 4 wherein each permanent magnet comprises a doughnut-shaped magnet and each actuator is disposed for movement within a center hole in one of the doughnut-shaped magnets.

6. The apparatus according to claim 5 wherein each movable means is mounted and configured for movement between respective permanent magnets and actuators.

7. The apparatus according to claim 6 wherein said cable means comprises a slidable center wire attached to the movable means and sheath means, surrounding said center wire and fixed to a valve housing, for enabling operation of the valve means through the cable means without stabilizing the valve housing.

8. The apparatus according to claim 7 wherein the manually operable lever means includes releasable lock means for holding the movable means in a position maintaining the actuator in the second position.

9. The apparatus according to claim 8 wherein said manually operable lever means comprises a foot pedal.

10. The apparatus according to claim 8 wherein said manually operable lever means comprises a knee pedal.

11. Water valve apparatus with distal control for adapting an existing water faucet to remote control operation, said water valve apparatus comprising:

a valve housing including hot and cold water inlets and outlets;

flexible water line means for interconnecting said valve housing hot and cold water inlets and outlets to hot and cold water sources and to hot and cold water inlets of the existing water faucet without fixing said valve housing to any permanent structure;

cold water valve means for controlling flow of cold water therethrough, said cold water valve means including a movable actuator for starting and stopping flow of cold water;

hot water valve means for controlling flow of hot water therethrough, said hot water valve means including a movable actuator for starting and stopping flow of hot water;

permanent magnet means, disposed proximate the actuators for magnetic engagement therewith, for moving the actuator between a first position stopping water flow through the hot and cold valve means and a second position allowing water flow through the hot and cold valve means;

movable means for altering the magnetic engagement between the permanent magnet means and said actuators;

cable means, having a distal and a proximal end, for moving said movable means; said cable means proximal end being connected with said movable means; said cable means comprising a slidable center wire attached to the movable means and sheath means, surrounding said center wire and fixed to the valve housing, for enabling operation of the valve means through the cable means without stabilizing the valve housing; and manually operable lever means, connected to the cable means distal end, for operating said cable means in a manner causing movement of the movable means and concomitant movement of both actuator means, as a result of magnetic engagement alteration, in order to start and stop water flow through both the hot and cold water valve means.

12. The apparatus according to claim 11 wherein the permanent magnet means comprises two separate permanent magnets and two movable means.

13. The apparatus according to claim 12 further comprising means for enabling simultaneous movement of the two movable means by the cable means.

14. The apparatus according to claim 13 wherein each permanent magnet comprises a doughnut-shaped magnet and each actuator is disposed for movement within a center hole in one of the doughnut-shaped magnets.

15. The apparatus according to claim 14 wherein each movable means is mounted and configured for movement between separate permanent magnets and actuators.

16. The apparatus according to claim 15 wherein the manually operable lever means includes releasable lock means for holding the movable means in a position maintaining the actuator in the second position.

17. The apparatus according to claim 15 wherein said manually operable lever means comprises a foot pedal.

18. The apparatus according to claim 15 wherein said manually operable lever means comprises a knee pedal.

* * * * *